2,988,522
GRAPHITE BORON NEUTRON SHIELDING

Charles R. F. Smith, Simi, and Edward L. Reed, Woodland Hills, Calif., assignors to North American Aviation, Inc.
No Drawing. Filed Nov. 25, 1955, Ser. No. 549,151
9 Claims. (Cl. 252—478)

This invention relates to a new and novel neutron shielding material and a process of making such material.

Heretofore, graphite, as well as other materials, has been used as thermal neutron shielding material. Graphite alone, however, does not have an optimum shielding effect for both fast and slow neutrons. The present invention provides a specific boron-impregnated graphite which is formed into shielding blocks for use in a nuclear reactor as a neutron shielding material. More particularly, the invention concerns a new composition of matter, used as a shielding material and having a high degree of dimensional stability, comprising magnesium oxide, boron oxide, and graphite. The present invention is a further improvement of the invention described and claimed in the co-pending application of Eugene V. Clark, U.S. Application Serial No. 549,150 filed November 25, 1955.

An object of this invention is to provide a composition of matter comprising magnesium oxide, boron oxide, and graphite.

A further object of this invention is to provide a composition of matter consisting of graphite and from 10% to 90% by weight of boron oxide, containing from 5% to 95% by weight of magnesium oxide.

A still further object of this invention is to provide a composition of matter consisting of a mixture of from 53% to 64% by weight of magnesium oxide in boron oxide and from 10% to 90% by weight of graphite.

An additional object of this invention is to provide a dimensionally stable boron-containing graphite body.

A further object of this invention is to provide a dimensionally stable neutron shielding material of boron oxide and graphite, with a magnesium oxide binder.

A still further object of this invention is to provide a method of making a dimensionally stable high-temperature biological shield, using magnesium oxide as a binder for graphite and boron oxide.

The above objects, as well as other objects of this invention, will be apparent from the following description of the invention.

A need has developed for a biological shield for moderating and stopping neutron flux extending beyond a nuclear reactor core. The combination of a graphite shield impregnated with boron oxide meets this need. As fully described in the above identified co-pending application, the hot-pressing of graphite and boron oxide resulted in a composition of matter suitable for a neutron shield and containing at least 50–100 mg. of boron per cc. In this pressed composition the boron oxide acted as a glassy binder cementing the graphite powder into a structurally sound body. The boron oxide in the graphite-boron oxide system tends to act like a viscous liquid through some of the temperature range in which the shield material must operate. This has given rise to some permanent distortion when the graphite-boron oxide blocks are cycled through temperatures in the range of 0° C. to 900° C.

The present invention thus sought a binder or the like which would mix with boron oxide and would remain solid and without phase change in the above operating range. It was discovered that the incorporation of magnesium oxide to the boron oxide imparted a high degree of dimensional stability to the boron-impregnated shielding blocks. This result was obtained by mixing boron oxide and magnesium oxide in certain percentile ranges with certain percentages of graphite and then hot-pressing the overall mixture to a solid mass with the attainment of over 100 milligrams per cc. of boron in the finished article.

In practicing the invention, a mixture of magnesium oxide powder and boron oxide powder, the latter preferably in the hydrated form, is mixed and then fused into a frit at a temperature above 577° C., the melting point of boron oxide. The upper limit can be considered the melting point of magnesium oxide, namely, 1900° C. The amount of magnesium oxide in the boron oxide may vary from 5% to 95% by weight. To provide a composition of matter usable as a neutron shield, in which operating temperatures of 700° to 800° C. are encountered, it is particularly desirous to have the frit contain 53% to 64% by weight of magnesium oxide, thus conforming to the phase system $2MgO \cdot B_2O_3 - 3MgO \cdot B_2O_3$, which exhibits no phase change below 1313° C. The complete phase diagram for $MgO-B_2O_3$ may be seen in detail on page 28 of "Phase Diagrams for Ceramists" by F. P. Hall and Herbert Insley, published in 1947. A binder composed of the above phase system allows plastic flow under pressure at about 1000° C., and after proper annealing, the system is virtually dimensionally stable up to about 850° C.

The magnesium oxide and boron oxide are mixed by milling, preferably in a steel ball mill or other mechanical mixing device. The mixture is then fused, usually in a graphite crucible, followed by cooling to room temperature. The resultant hard, flint-like material is then crushed, ground, milled, and sieved. The mixed oxides are passed through a screen, typically 80 mesh, and are then mixed with powdered graphite. The graphite is ordinarily of a —200 mesh size and of sufficient uniformity to impart strength and stability to the shielding block. The particular choice of mesh sizes, namely, —80 mesh and —200 mesh, are chosen to minimize particle separation in the handling and subsequent pressing of the mixed powders. The graphite may be of the AGX type (reactor grade), the properties of which may be seen in The Reactor Handbook, volume III, entitled "Materials," published March 1955 by the U.S. Government Printing Office.

The present invention contemplates having from 10% to 90% by weight of mixed oxides in the final shielding material composition. Thus, the graphite will also be in a range of from 10% to 90%. In the particular application of the reactor shield described above, it is ordinarily desirous that from 45% to 65% graphite be included in the final product. This insures a boron content in the neighborhood of 100 milligrams per cc. when 53% to 64% magnesium oxide is contained in the boron oxide.

The boron oxide-magnesium oxide-graphite mixture is then placed in a steel or graphite die and subjected to pressures of from 500 p.s.i. to 7,000 p.s.i. (up to 3,500 p.s.i. when using graphite dies) at a temperature of from 800° C. to 1300° C. The lower limit is set at a temperature at which plastic flow will be obtained, and the upper limit at a temperature below the melting point of the mixed oxide frit. The actual time necessary to accomplish sufficient coalescing of the powdered particles is dependent on the particular pressure and temperature used and the particle size of the powder. The times have been found to vary from as little as five minutes to times of over 1½ hours.

The following is given as a complete example of practicing the invention: A mixture of 56% magnesium oxide and 44% boron oxide was milled in a steel ball mill. This mixture was fused in a covered graphite crucible at 1500° C. After fusion, the hard button-like material was crushed, milled, and sieved. The —80 mesh mixed oxide powder was milled with −200 mesh AGX graphite powder giving a composition having 54% by weight graphite, 20% by weight boron oxide, and 26% by weight magnesium oxide. The powder was placed in a graphite die and pressed at a pressure of 2,920 p.s.i. for seven minutes and at a temperature of slightly greater than 1000° C. A pressure of 2,800 p.s.i. was maintained for one hour until the die had cooled to room temperature. The density of the solid, structurally sound blocks formed was 1.93 grams per cc. before annealing. The boron content thereof was 116 mg. per cc. The blocks were annealed for over four hours at a temperature of about 700° C., and cycled to temperatures in the range of 855° C. to 870° C. for corresponding periods of time. In dimensional stability tests it was noted that a 3.5% expansion in thickness and 0.4% expansion in diameter occurred in the initial annealing; while after the subsequent cycling operations, additional expansions of 0.18% and 0.02%, respectively, were noted. Thus, it can be seen that the boron-impregnated block of this invention is practically fully dimensionally stable at the desired operating temperatures. X-ray analyses of the hot-pressed, annealed blocks have shown the co-existence of crystalline $2MgO \cdot B_2O_3$ and $3MgO \cdot B_2O_3$ in the resultant product.

Although the invention has been described in detail by the above example and description, it is to be clearly understood that the same is by way of illustration and example only and is not to be taken by way of limitation, the spirit and scope of this invention being limited only by the terms of the appended claims.

We claim:
1. A composition of matter consisting essentially of from about 10% to 90% by weight of a frit consisting essentially of from 53% to 64% by weight of magnesium oxide and the remainder of boron oxide; and the remainder from 90% to 10% by weight of graphite.

2. A composition of matter consisting essentially of from 65% to 45% by weight of graphite and the remainder of from 35% to 55% by weight of a frit consisting essentially of from 53% to 64% by weight of magnesium oxide and the remainder boron oxide.

3. A neutron shielding material consisting essentially of a coalesced mixture of from 90% to 10% by weight of graphite powder and the remainder from 10% to 90% by weight of a frit consisting of from 53% to 64% by weight of magnesium oxide and the remainder boron oxide.

4. A method of making a dimensionally stable, high temperature neutron shield comprising pressing a mixture consisting essentially of (1) from about 10 to about 90 weight percent powdered graphite, and (2) from about 90 to about 10 weight percent powdered magnesium oxide and boron oxide composition wherein the amount of magnesium oxide in said composition is from about 53 to about 64 weight percent, at a pressure of from about 500 p.s.i. to about 7000 p.s.i. and at a temperature of from about 800° C. to about 1300° C. until said mixture has coalesced.

5. A composition of matter consisting essentially of about 54 weight percent graphite and about 46 weight percent of a frit consisting essentially of about 56 weight percent magnesium oxide and about 44 weight percent boron oxide.

6. The method of claim 4 wherein said powdered magnesium oxide and boron oxide composition is a powdered fused mixture of boron oxide and magnesium oxide.

7. A method of making a dimensionally stable high temperature neutron shield comprising pressing a mixture consisting essentially of (1) from about 65 to about 45 weight percent powdered graphite, and (2) from about 35 to about 55 weight percent powdered fused magnesium oxide and boron oxide composition wherein the amount of magnesium oxide in said composition is from about 53 to about 64 weight percent, at a pressure of from about 500 p.s.i. to about 7000 p.s.i. and at a temperature of from about 800° C. to about 1300° C. until said mixture has coalesced.

8. The method of claim 7 with the additional step of annealing said shield at a temperature of about 700° C.

9. A method of making a dimensionally stable high temperature neutron shield comprising pressing a mixture consisting essentially of (1) from about 65 to about 45 weight percent powdered graphite, and (2) from about 35 to about 55 weight percent powdered fused magnesium oxide and boron oxide composition wherein the amount of magnesium oxide in said composition is from about 53 to about 64 weight percent, at a pressure of about 2900 p.s.i. and at a temperature of about 1000° C. and annealing said shield at a temperature of about 700° C.

References Cited in the file of this patent
UNITED STATES PATENTS

| | | |
|---|---|---|
| 670,671 | Hadaway | Mar. 26, 1901 |
| 1,458,725 | Ohman | June 12, 1923 |
| 1,577,124 | Jackman | Mar. 16, 1926 |
| 1,653,850 | Hauman | Dec. 27, 1927 |
| 1,674,961 | Diamond | June 26, 1928 |
| 2,063,329 | Morrison | Dec. 8, 1936 |
| 2,106,578 | Schwartzwalder et al. | Jan. 25, 1938 |
| 2,688,562 | West et al. | Sept. 7, 1954 |
| 2,769,918 | Tittle | Nov. 6, 1956 |

FOREIGN PATENTS

| | | |
|---|---|---|
| 456,602 | Great Britain | Nov. 12, 1936 |

OTHER REFERENCES

Reactor Handbook, vol. 3 (TID-3647), U.S. Atomic Energy Commission publication, February, 1955, pages 522–523.